(12) United States Patent
Lee et al.

(10) Patent No.: US 12,175,233 B2
(45) Date of Patent: Dec. 24, 2024

(54) VEHICLE CONTROL APPARATUS INCLUDING RXSWIN INFORMATION AND VEHICLE CONTROL SYSTEM INCLUDING THE SAME

(71) Applicants: HYUNDAI MOTOR COMPANY, Seoul (KR); Kia Corporation, Seoul (KR)

(72) Inventors: Hye Ryun Lee, Suwon-si (KR); Jin Gu Kwon, Seoul (KR); Kyung Tae Noh, Hwaseong-si (KR); Min Ho Heo, Hwaseong-si (KR); Sug Woo Shin, Suwon-si (KR); Duk Won Hong, Hwaseong-si (KR); Dong Jun Ahn, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 85 days.

(21) Appl. No.: 17/989,180

(22) Filed: Nov. 17, 2022

(65) Prior Publication Data

US 2024/0061670 A1 Feb. 22, 2024

(30) Foreign Application Priority Data

Aug. 19, 2022 (KR) .......................... 10-2022-0104236

(51) Int. Cl.
*G06F 9/44* (2018.01)
*G06F 8/65* (2018.01)
(Continued)

(52) U.S. Cl.
CPC . *G06F 8/65* (2013.01); *G06F 8/71* (2013.01)

(58) Field of Classification Search
CPC . G06F 8/65; G06F 8/71; G06F 11/327; G06F 9/546; H04L 12/66
See application file for complete search history.

(56) References Cited

U.S. PATENT DOCUMENTS 11,870,768 B1 * 1/2024 Vishwakarma ......... H04W 8/26
2020/0057630 A1 * 2/2020 Cho .......................... G06F 8/65
(Continued)

FOREIGN PATENT DOCUMENTS

CN 114003271 A * 2/2022 ............... G06F 8/10
DE 102021004346 A1 * 10/2021 ............. G06F 16/90
(Continued)

OTHER PUBLICATIONS

Taehyoung Kim, Compare of Vehicle Management over the Air and On-Board Diagnostics, 2019, pp. 1-2. https://ieeexplore.ieee.org/stamp/stamp.jsp?tp=&arnumber=8986260 (Year: 2019).*
(Continued)

*Primary Examiner* — Mongbao Nguyen
(74) *Attorney, Agent, or Firm* — MORGAN, LEWIS & BOCKIUS LLP (57) ABSTRACT

A vehicle control apparatus and a vehicle control system including the same are provided. The vehicle control apparatus includes an electronic control unit and a gateway. The electronic control unit is configured to store software identification management information associated with the electronic control unit. The gateway is configured to store a master list of the software identification management information, which includes the software identification management information received from the electronic control unit, deliver update information related to software associated with vehicle type approval (VTA) to the electronic control unit corresponding to the update information, as the update information is received, and update the software identification management information associated with the electronic control unit in the master list as an update of the software of the electronic control unit is completed.

18 Claims, 5 Drawing Sheets

(51) Int. Cl.
*G06F 8/71* (2018.01)
*G06F 9/445* (2018.01)
*G06F 9/455* (2018.01)

(56) References Cited

U.S. PATENT DOCUMENTS

| | | | | |
|---|---|---|---|---|
| 2021/0389945 | A1* | 12/2021 | Teraoka | G06F 8/71 |
| 2022/0012043 | A1* | 1/2022 | Sakurai | H04L 9/3239 |
| 2022/0038902 | A1* | 2/2022 | Mueck | H04W 52/367 |
| 2022/0317995 | A1* | 10/2022 | Nagamitsu | B60W 50/06 |
| 2023/0188361 | A1* | 6/2023 | Misuraca | H04L 63/0428 |
| | | | | 713/158 |

FOREIGN PATENT DOCUMENTS

| | | | | |
|---|---|---|---|---|
| DE | 112020004011 T5 * | 5/2022 | | G06F 8/65 |
| KR | 102239904 B1 * | 4/2021 | | G06F 8/71 |
| KR | 20220118324 A * | 8/2022 | | G06F 8/654 |
| WO | WO-2013093209 A1 * | 6/2013 | | G06F 21/575 |

OTHER PUBLICATIONS

Michael Fisher, Towards a Framework for Certification of Reliable Autonomous Systems, 2020, pp. 1-52. chrome-extension://efaidnbmnnnibpcajpcglclefindmkaj/https://arxiv.org/pdf/2001.09124 (Year: 2020).*

English Translation, Seiler (DE 102021004346 A1), 2021, pp. 1-8. (Year: 2021).*

English Translation, Yloenen (WO 2013093209 A1), 2013, pp. 1-124. (Year: 2013).*

* cited by examiner

| RXSWIN PROPERTIES ▷ | | Length | Reg. Authority | Reg. No | Space | Vehicle Type | Approval Type | /Extension | RXSWIN VALUE (106) |
|---|---|---|---|---|---|---|---|---|---|
| DESCRIPTION ▷ | | RXSWIN DATA LENGTH | REGULATION ISSUING AUTHORITY INFORMATION (101) | REGULATION NUMBER (102) | SPACE | VEHICLE TYPE PROJECT INFORMATION (103) | VEHICLE TYPE INFORMATION (104) | RE-CERTIFICATION INFORMATION (105) | |
| EXAMPLE 1 | RXSWIN Initial | 0x13 | EC | 1008/2010 | " " | CN7 | /1 | /0 | (0x16) EC1008/2010 CN7/1/0 |
| | RXSWIN Extension | 0x13 | EC | 1008/2010 | " " | CN7 | /1 | /1 | (0x16) EC1008/2010 CN7/1/1 |
| EXAMPLE 2 | VEHICLE TYPE GASOLINE | 0x0B | R | 83 | " " | DN8 | /1 | /0 | (0x16) R83 DN8/1/0 |
| | VEHICLE TYPE DIESEL | 0x0B | R | 83 | " " | DN8 | /2 | /0 | (0x16) R83 DN8/2/0 |

RXSWIN DETAILS FOR EACH VEHICLE TYPE

☐ RXSWIN DETAILS FOR EACH VEHICLE TYPE                                                                 ✕

| VEHICLE TYPE | OS | REGULATION NUMBER | R56 | Revision | | ASSOCIATED CONTROLLER | 01 | EMS TCU |
|---|---|---|---|---|---|---|---|---|
| REGULATION AREA | EU | REGULATION AUTHORITY | UNECE | | | | | |

💾 SAVE

ISSUED RXSWIN

| RXSWIN | TYPE APPROVAL CERTIFICATION NUMBER | TYPE APPROVAL CERTIFICATION TYPE |
|---|---|---|
| ☐ R56 OS/1/0 | E4-56R01-060764-00 | NEW |
| ☐ R56 OS/1/1 | E4-56R01-060770-01 | Extension |
| ☐ R56 OS/2/0 | E4-56R01-060766-00 | NEW |
| ☐ R56 OS/3/0 | E4-56R01-060766-00 | NEW |

RXSWIN DETAILS

| ASSOCIATED CONTROLLER | SW PKG CONNECTION | Pakage | SW Package |||| CONFIRMATION | UPDATE | RXSWIN STATE |
|---|---|---|---|---|---|---|---|---|---|
| | | | P/No Group | SW Unit No. | Source Version | Target Version | | | |
| EMS | | J9_21_EMS_KEFICO_K1_Engine Type:GAMMAⅡ1.6TGDI | 95400 XD000 | 1 | *** | A.00 | CONFIRMATION | UPDATE | CONFIRMATION |
| TCU | ADD | J9_21_TCU)VITESCO_ZZ_PT COMBI(TM):7DCT2 | 84200 XD000 | 1 | *** | A.00 | CONFIRMATION | | WRITING |
| EMS | ADD | J9_21_EMS_KEFICO_K1_Engine Type:GAMMAⅡ1.6TGDI | 95400 XD010 | 1 | *** | A.01 | CONFIRMATION | | |
| TCU | | J9_21_TCU)VITESCO_ZZ_PT COMBI(TM):7DCT2 | 84200 XD010 | 1 | *** | A.01 | | | |
| EMS | | J9_21_EMS_KEFICO_K1_Engine Type:GAMMAⅡ1.6TGDI | 95400 XD010 | 1 | *** | A.00 | | UPDATE | CONFIRMATION |
| TCU | | J9_21_TCU)VITESCO_ZZ_PT COMBI(TM):1MT | 84200 XD010 | 1 | *** | A.00 | | | |
| EMS | | J9_21_EMS_KEFICO_K1_Engine Type:GAMMAⅡ1.6TGDI | 95400 XD010 | 1 | *** | A.00 | | UPDATE | CONFIRMATION |
| TCU | | J9_21_TCU)VITESCO_ZZ_PT COMBI(TM):1MT | 84200 XD010 | 1 | *** | A.00 | | | |

SOFTWARE VERSION INFORMATION

VEHICLE CONTROL APPARATUS INCLUDING RXSWIN INFORMATION AND VEHICLE CONTROL SYSTEM INCLUDING THE SAME

CROSS-REFERENCE TO RELATED APPLICATION

The present application claims priority to Korean Patent Application No. 10-2022-0104236, filed on Aug. 19, 2022, the entire contents of which is incorporated herein for all purposes by this reference.

BACKGROUND OF THE PRESENT DISCLOSURE

Field of the Present Disclosure

The present disclosure relates to a vehicle control apparatus including regulation X software identification number (RXSWIN) information (hereinafter, the RXSWIN information may be included in software identification management information in the specification) and a vehicle control system including the same, and more particularly, relates to a vehicle control apparatus including an RXSWIN information management system complying with the software update-related regulation R156 of the United Nations Economic Commission for Europe (UNECE).

Description of Related Art

As the in-vehicle system has been digitalized or softwareized, for example, automation, connectivity, and sharing mobility have been provided and autonomous vehicles have been developed, recently, about 150 electronic control units (ECUs) and about 100 million lines of software code have been loaded into the vehicle. This is expected to increase further in the future. Such software loaded into the vehicle needs to be updated rapidly like various mobile products to improve an error and upgrade an existing function.

A version of software for each ECU in the vehicle is managed with regard to the convenience of development. When a software update occurs after the vehicle is mass-produced, it is difficult to determine whether there is a linking function between ECUs, unnecessary vehicle checks should be performed because update management for whether an update is correctly performed is insufficient, or the software update of the ECU takes a long time. Thus, there is a demand for a systematic management scheme to establish a process throughout updates of pieces of software loaded into the vehicle and manage products.

Furthermore, as the demand for legal regulation on software updates has emerged to prepare countermeasures against unapproved forgery/falsification and security stability of in-vehicle software such as illegal hacking of in-vehicle electronic systems and illegal vehicle modifications, the UNECE defines the software update-related regulation R156 and requires vehicle manufacturers to comply with it. Because all vehicle manufacturers may obtain a certification complying with the regulation R156 before mass-producing vehicles, there is a need to establish an update management system of software meeting the regulation R156.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus including an RXSWIN information management system complying with the software update-related regulation R156 of the UNECE and a vehicle control system including the same.

Another aspect of the present disclosure provides a management system including a manner which configures RXSWIN information meeting six items of major requirements for the RXSWIN of the regulation R156 associated with a software update of the UNECE and generates, searches for, and writes the RXSWIN information.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include an electronic control unit and a gateway. The electronic control unit may be configured to store software identification management information associated with the electronic control unit. The gateway may be configured to store a master list of the software identification management information, the master list including the software identification management information received from the electronic control unit, deliver update information related to software associated with vehicle type approval (VTA) to the electronic control unit corresponding to the update information, as the update information is received, and update the software identification management information associated with the electronic control unit in the master list as an update of the software of the electronic control unit is completed.

According to an exemplary embodiment of the present disclosure, the gateway may be configured to transmit information indicating that the update of the software is completed to a server device as the update of the software is completed, for matching with software identification management information stored in the server device.

According to an exemplary embodiment of the present disclosure, the gateway may be configured not to update the master list, when receiving update information related to software not associated with the VTA.

According to an exemplary embodiment of the present disclosure, the gateway may be configured not to update the master list, when the update of the software of the electronic control unit is not successfully completed.

According to an exemplary embodiment of the present disclosure, the gateway may be configured to query the master list for version information of specific software identification management information and transmit the version information to a diagnostic device, as a request for the version information related to the specific software identification management information is received from the diagnostic device.

According to an exemplary embodiment of the present disclosure, the gateway may be configured to receive a request for version information related to specific software identification management information from a diagnostic device and transmit an error code to the diagnostic device when it is impossible to query the master list for the version information of the specific software identification management information.

According to an exemplary embodiment of the present disclosure, the gateway may be configured to collect a plurality of pieces of software identification management information received from a plurality of electronic control units included in the vehicle control apparatus and generate and update the master list.

According to an exemplary embodiment of the present disclosure, the software identification management information stored in the electronic control unit may be one ASCII string including information related to an authority issuing a regulation associated with the electronic control unit, information related to a regulation number of the regulation, information related to a vehicle type receiving the VTA, and re-certification information of the VTA.

According to another aspect of the present disclosure, a vehicle control system may include a server device that distributes update information related to software associated with vehicle type approval (VTA) and a vehicle control apparatus that receives the update information and has a vehicle identification number (VIN) being a target of the update information. The vehicle control apparatus may deliver the update information to an electronic control unit of the vehicle control apparatus, the electronic control unit corresponding to the received update information, and may update software identification management information associated with the electronic control unit in a master list stored in a gateway of the vehicle control apparatus as an update of the software of the electronic control unit is completed.

According to an exemplary embodiment of the present disclosure, the gateway may transmit information indicating that the update of the software is completed to the server device as the update of the software is completed. The server device may update version information of software identification management information stored in the server device as the information indicating that the update of the software is completed is received.

According to an exemplary embodiment of the present disclosure, the gateway may fail to update the master list, when receiving update information related to software not associated with the VTA.

According to an exemplary embodiment of the present disclosure, the gateway may fail to update the master list, when the update of the software of the electronic control unit is not successfully completed.

According to an exemplary embodiment of the present disclosure, the server device may fail to update software identification management information stored in the server device, when receiving update complete information related to software not associated with the VTA and when the update of the software of the electronic control unit is not successfully completed.

According to an exemplary embodiment of the present disclosure, the server device may link and store software identification management information stored in the server device to version information of related software.

According to an exemplary embodiment of the present disclosure, the server device may generate and store software identification management information using one ASCII string including information related to an authority issuing a regulation, information related to a regulation number of the regulation, information related to a vehicle type receiving the VTA, and re-certification information of the VTA.

According to an exemplary embodiment of the present disclosure, the server device may store and manage a history of software identification management information every a plurality of VINs.

According to an exemplary embodiment of the present disclosure, the server device may perform an operation of identifying VINs being targets of the update information and a master list for every VINs, before distributing the update information related to the software associated with the VTA.

According to an exemplary embodiment of the present disclosure, the gateway may query the master list for version information of specific software identification management information and may transmit the version information to a diagnostic device, as a request for the version information related to the specific software identification management information is received from the diagnostic device.

According to an exemplary embodiment of the present disclosure, the gateway may receive a request for version information related to specific software identification management information from a diagnostic device and may transmit an error code to the diagnostic device when it is impossible to query the master list for the version information of the specific software identification management information.

According to an exemplary embodiment of the present disclosure, the gateway may collect a plurality of pieces of software identification management information received from a plurality of electronic control units included in the vehicle control apparatus and may generate and update the master list.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, a same reference numerals will be used throughout to designate a same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the regulation R156 associated with a software update defined by the UNECE, a plurality of requirements for a software update management system are defined to establish a process throughout a software update in a vehicle and manage products and vehicle manufacturers are required to obtain a certification complying with the regulation R156. The regulation R156 requires to identify an association with vehicle type approval (VTA) and record and manage an RXSWIN for each vehicle manufacturer so that an update is securely performed, when there is a need to change software of the mass-produced vehicle.

The RXSWIN is a unique identification number for identifying a version of software of an ECU associated for each type approval type of the European applicable regulation (RX). For example, when the vehicle obtains type approval for the regulation "R-48 Light Installation", it may record an identifier referring to a combination of software versions of control devices (e.g., an IBU, an ICU, and the like) associated with requirements of the regulation as the RXSWIN.

The regulation R156 defines that the RXSWIN meets the following six requirements. The RXSWIN 1) should be managed in conjunction with a version of software in a computer server device of a vehicle manufacturer, 2) should be stored and managed even in the vehicle, and 3) should be read from the vehicle by a diagnostic device. Furthermore, 4) the RXSWIN should be updated in the vehicle when software affecting the regulation (affecting type approval) is changed, 5) the matching of whether an RXSWIN value in the vehicle and an RXSWIN value of a server of a vehicle manufacturer are identical to each other should be verified, and 6) an RXSWIN history should be recorded and stored for each vehicle identification number (VIN).

Hereinafter, a description will be provided in detail of embodiments of the present disclosure about an RXSWIN management system for obtaining a certification complying with the regulation R156, based on RXSWIN information included in software identification management information, with reference to FIG. 1, FIG. 2, FIG. 3, and FIG. 4.

Such detailed embodiments are for convenience of understanding of description, and it is obvious that the scope of the present disclosure is not limited to various exemplary embodiments about the RXSWIN management system.

Figure 1:
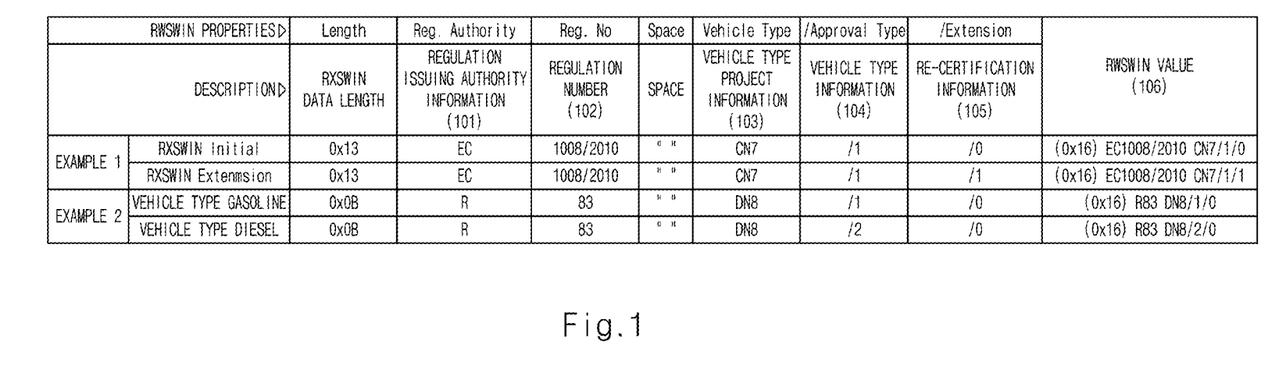
FIG. 1 is a drawing illustrating a structure of RXSWIN information according to an exemplary embodiment of the present disclosure.

FIG. 1 is a drawing illustrating a structure of RXSWIN information according to an exemplary embodiment of the present disclosure.

Referring to FIG. 1, according to an exemplary embodiment of the present disclosure, to meet the regulation R156, a vehicle manufacturer may configure, generate, and update RXSWIN information to include the following at least five items, in a computer server device.

According to an exemplary embodiment of the present disclosure, the RXSWIN information may at least include regulation issuing authority information (Reg. Authority) 101, a regulation number (Reg. No) 102, vehicle type project information (Vehicle Type) 103, vehicle type information (/Approval type) 104, and re-certification information (/Extension) 105.

According to an exemplary embodiment of the present disclosure, the regulation issuing authority information 101 may be information related to an authority issuing a regulation associated with a vehicle type, an electronic control unit (ECU), software, or the like, which may be represented as prefix information indicating the authority.

According to an exemplary embodiment of the present disclosure, the regulation number 102 may be information indicating a corresponding regulation number in the regulation associated with the vehicle type, the ECU, the software, or the like.

According to an exemplary embodiment of the present disclosure, the vehicle type project information 103 may be information including at least one of "a vehicle type-related project name" or a "vehicle age" at the time of type approval certification. According to an exemplary embodiment of the present disclosure, the vehicle type project information 103 may be displayed in a form of a "project name-vehicle age".

According to an exemplary embodiment of the present disclosure, the vehicle type information 104 may be information indicating a type of a vehicle (or a vehicle type) at the time of type approval certification. For example, referring to example 2 of FIG. 1, the vehicle type information 104 may be represented by "1", when the vehicle type is a gasoline type, and the vehicle type information 104 may be represented by "2", when the vehicle type is a diesel type. Furthermore, although not illustrated in FIG. 1, the vehicle type information 104 may indicate the other vehicle type such as a hybrid vehicle, an electric vehicle, or a hydrogen vehicle.

Furthermore, according to an exemplary embodiment of the present disclosure, when regulation contents are revised and type approval is re-certified, the vehicle type information 104 may indicate regulation revision information.

According an exemplary embodiment of the present disclosure, when type certification is re-certified due to a software update, the re-certification information 105 may be information indicating it. For example, referring to example 1 of FIG. 1, the re-certification information 105 may be represented by "0", when there is initial type certification (RXSWIN Initial), and the re-certification information 105 may be represented by "1", when type certification is re-certificated (RXSWIN Extension). Furthermore, although not illustrated in FIG. 1, when there is an increase in the number of times type certification is re-certificated as there is an increase in the number of updates.

According an exemplary embodiment of the present disclosure, an RXSWIN value 106 may be represented by one ASCII string including the above-mentioned five items. According to an exemplary embodiment of the present disclosure, the RXSWIN value 106 may be a value in which values respectively corresponding to the regulation issuing authority information 101, the regulation number 102, the vehicle type project information 103, the vehicle type information 104, and the re-certification information 105 are provided in line.

For example, when the regulation issuing authority information 101 is "EC", when the regulation number 102 is "1008/2010", when the vehicle type project information 103 is "CN7", when the vehicle type information 104 is "1", and when the re-certification information 105 is "0", the RXSWIN value 106 may be "EC1008/2010 CN7/1/0". According to an exemplary embodiment of the present disclosure, a slash (/) may be added in front of the vehicle type information 104 and the re-certificate information 105 for division.

Referring to FIG. 1, furthermore, for example, the RXSWIN value 106 may be represented by one ASCII string such as "EC1008/2010 CN7/1/1" or "R83 DN8/1/0', 'R83 DN8/2/0". Representing the RXSWIN value 106 using the one ASCII string may be applying the standard ISO 14229 about unified diagnostic services (UDS) to increase the efficiency of storage.

According to an exemplary embodiment of the present disclosure, the RXSWIN information including at least one RXSWIN value 106 generated by a computer server device of a vehicle manufacturer may be stored in software of an ECU in a development stage. The ECU in which the RXSWIN information is embedded may be loaded into the vehicle in a vehicle manufacturing process. Furthermore, the RXSWIN information embedded in the ECU (or a gateway) may be updated by interworking with a software update of the ECU. The RXSWIN information of the computer server device may be matched with the RXSWIN information embedded in the ECU through communication between the ECU (or the gateway) and the computer server device of the vehicle manufacturer. Hereinafter, a description will be provided in detail of the update and integrated management system of the RXSWIN information.

Figure 2:
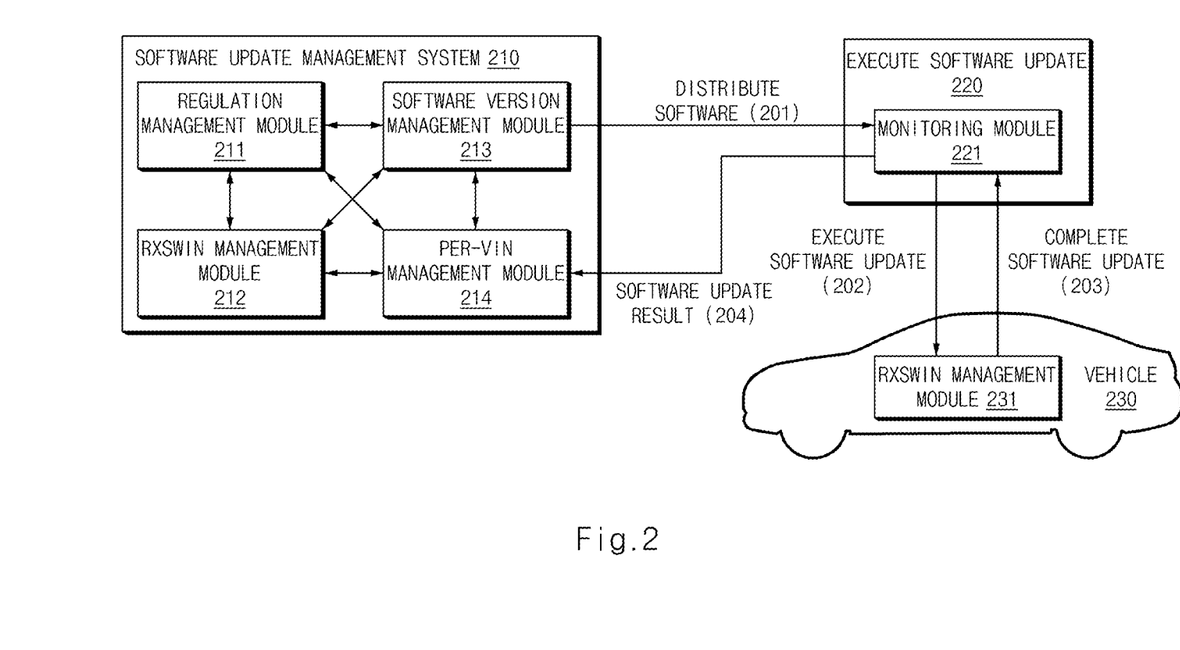
FIG. 2 is a drawing illustrating an RXSWIN information management system according to an exemplary embodiment of the present disclosure.
Figure 3:
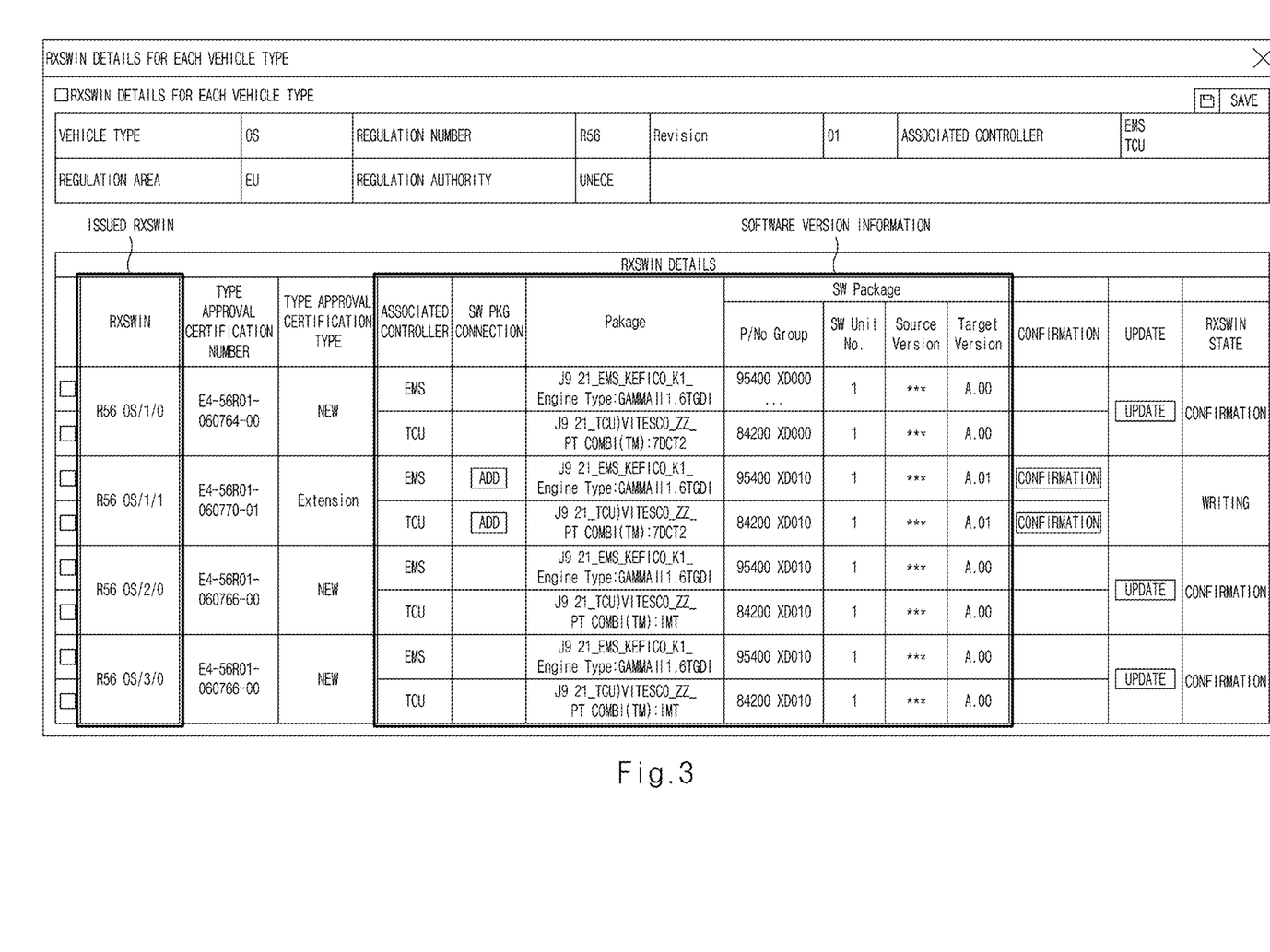
FIG. 3 is a drawing illustrating RXSWIN details managed by an RXSWIN information management system according to an exemplary embodiment of the present disclosure.

FIG. 2 is a drawing illustrating an RXSWIN information management system according to an exemplary embodiment of the present disclosure. FIG. 3 is a drawing illustrating RXSWIN details managed by an RXSWIN information management system according to an exemplary embodiment of the present disclosure.

Referring to FIG. 2, an RXSWIN information management system according to various exemplary embodiments of the present disclosure may be implemented by an operation among a software update management system 210 of a server device of a vehicle manufacturer, a vehicle 230 (hereinafter, used as the same meaning as a vehicle control apparatus) manufactured by the vehicle manufacturer, and a relay system 220 for relaying between the software update management system 210 and the vehicle 230.

According to an exemplary embodiment of the present disclosure, the software update management system 210 may include a regulation management module 211, an RXSWIN management module 212, a software version management module 213, and a per-VIN management module 214.

According to an exemplary embodiment of the present disclosure, the regulation management module 211 may store vehicle type list information including a plurality of vehicle types. The plurality of vehicle types may be included in a regulation list associated for each vehicle type. The regulation management module 211 may store and manage information on which the regulation list associated for each vehicle type is mapped. According to an exemplary embodiment of the present disclosure, the regulation list may include at least one regulation item, and each regulation item may include information related to at least one of a regulation issuing authority or a regulation number.

Furthermore, the regulation management module 211 may store and manage information on which a type approval type associated for each regulation item of the regulation list is mapped. According to an exemplary embodiment of the present disclosure, at least one type approval type may be mapped for each regulation item. Furthermore, the regulation management module 211 may store and manage information on which at least one ECU associated for each type approval type is mapped.

In other words, the regulation management module 211 may store and manage information on which a vehicle type, a regulation associated for each vehicle type, a type approval type associated with each regulation, or an ECU associated for each type approval type are mapped. The regulation management module 211 may deliver the mapped information to the RXSWIN management module 212.

According to an exemplary embodiment of the present disclosure, the RXSWIN management module 212 may generate initial RXSWIN values for each vehicle type. According to an exemplary embodiment of the present disclosure, the RXSWIN management module 212 may generate initial RXSWIN values based on the information on which the vehicle type, the regulation associated for each vehicle type, the type approval type associated with each regulation, and the ECU associated for each type approval type are mapped, which are received from the regulation management module 211. According to an exemplary embodiment of the present disclosure, the initial RXSWIN values may be automatically generated by the RXSWIN management module 212 in a computer server device of a vehicle manufacturer.

According to an exemplary embodiment of the present disclosure, the initial RXSWIN value generated by the RXSWIN management module 212 may be one ASCII string described with reference to FIG. 1 above. According to an exemplary embodiment of the present disclosure, version information of the initial RXSWIN value may be "0". According to an exemplary embodiment of the present disclosure, re-certification information (e.g., re-certification information 105 of FIG. 1) value of the initial RXSWIN value may be "0".

According to an exemplary embodiment of the present disclosure, the initial RXSWIN values generated by the RXSWIN management module 212 may be stored in software of an ECU in a development stage, and the ECU in which RXSWIN values are embedded may be loaded into the vehicle in a vehicle manufacturing process.

According to an exemplary embodiment of the present disclosure, the software version management module 213 may store and/or manage information on which an ECU list associated for each of the vehicle types is mapped. According to an exemplary embodiment of the present disclosure, the software version management module 213 may store and/or manage version information of software associated for each ECU.

In other words, the software version management module 213 may store and/or manage information on which a vehicle type, at least one ECU included in each vehicle type for each vehicle type, and version information of software associated for each ECU are mapped. According to an exemplary embodiment of the present disclosure, the software version management module 213 may deliver the mapped information to the RXSWIN management module 212.

According to an exemplary embodiment of the present disclosure, the software version management module 213 may interwork with a software update management system (SUMS) and may update a final version of software in the mapped information when an update event of the software occurs (or when distribution information related to a software update is identified).

According to an exemplary embodiment of the present disclosure, the RXSWIN management module 212 may map an RXSWIN value, an ECU associated with the RXSWIN value, and version information of software associated with the ECU to manage RXSWIN details. According to an exemplary embodiment of the present disclosure, the RXSWIN management module 212 may manage RXSWIN details based on the version information received from the software version management module 213.

Hereinafter, according to an exemplary embodiment of the present disclosure, a description will be provided of an RXSWIN management operation when it is necessary to update software periodically or depending on the occurrence of a specific event, after the vehicle 230 is mass-produced. According to an exemplary embodiment of the present disclosure, software may be updated wirelessly by an over-the-air (OTA) technology or wiredly by a separate diagnostic device, using distributed software update information.

According to an exemplary embodiment of the present disclosure, the software version management module 213 may store and/or manage information on which a vehicle type, at least one ECU included in each vehicle type for each vehicle type, and version information of software associated for each ECU are mapped. According to an exemplary embodiment of the present disclosure, the software version management module 213 may update a final version of software in the mapped information when an update event of the software occurs (or when distribution information related to a software update is identified).

According to an exemplary embodiment of the present disclosure, as the version information is updated, the software version management module 213 may transmit the updated version information to the RXSWIN management module 212.

According to an exemplary embodiment of the present disclosure, as the updated version information is received from the software version management module 213, the RXSWIN management module 212 may map and store the latest version information of software to RXSWIN values associated with the software, the update information of which is distributed. According to an exemplary embodiment of the present disclosure, the RXSWIN management module 212 may deliver an RXSWIN list (or a RXSWIN master list) on which the updated latest version information is mapped to the software version management module 213.

According to an exemplary embodiment of the present disclosure, as the RXSWIN information of the software update management system 210 is updated and managed to the latest version information of software, when requesting to identify whether it is necessary to update specific software wirelessly or through the diagnostic device, the vehicle (or a gateway or an ECU) may compare version information of RXSWIN information of the software update management system 210 with version information of RXSWIN information stored in the vehicle (or the gateway or the ECU) to determine whether it is necessary to update the specific software.

According to an exemplary embodiment of the present disclosure, the software version management module 213 may map and identify VINs of vehicles, classified as targets of a software update according to a vehicle type, a year of mass production, and/or the like, on a list of corresponding RXSWINs for each VIN, based on the received RXSWIN list.

According an exemplary embodiment of the present disclosure, in operation 201, the software version management module 213 may distribute an update version of software. According to an exemplary embodiment of the present disclosure, the update version of the software may include a VIN list of vehicles to be updated.

According to an exemplary embodiment of the present disclosure, the relay system 220 may include a monitoring module 221. According an exemplary embodiment of the present disclosure, the monitoring module 221 may identify an ECU associated with the update version of the distributed software and an RXSWIN list associated with the ECU (hereinafter, referred to as an "RXSWIN-ECU5 list"), based on the distributed update version of the software. According to an exemplary embodiment of the present disclosure, the relay system 220 may identify a VIN of a target vehicle to apply an update based on the RXSWIN list.

According to an exemplary embodiment of the present disclosure, in operation 202, the relay system 220 may execute a software update for the vehicle 230 including a VIN, which is a target to apply an update. According an exemplary embodiment of the present disclosure, the software update may be performed in an over-the-air (OTA) manner.

According to an exemplary embodiment of the present disclosure, receiving the software update information, the vehicle 230 may identify a current version of corresponding software of the vehicle 230 based on the "RXSWIN-ECU list" by the RXSWIN management module 231 loaded into the gateway of the vehicle 230. According to an exemplary embodiment of the present disclosure, when the version of the received software update information is higher than the current version of the software of the vehicle 230, the RXSWIN management module 231 may proceed with an update of the software.

According to an exemplary embodiment of the present disclosure, after the update of the software is completed, the RXSWIN management module 231 may update and store an RXSWIN value associated with the updated software in the RXSWIN information stored in the gateway and/or the ECU of the vehicle 230.

According to an exemplary embodiment of the present disclosure, when the updated software is software not associated with vehicle type approval, the RXSWIN management module 231 may fail to update the RXSWIN information stored in the gateway and/or the ECU of the vehicle 230.

According to an exemplary embodiment of the present disclosure, when the update of the software is not successfully completed, the RXSWIN management module 231 may fail to update the RXSWIN information stored in the gateway and/or the ECU of the vehicle 230.

According to an exemplary embodiment of the present disclosure, in operation 203, when the RXSWIN information is updated, the RXSWIN management module 231 of the vehicle 230 may deliver information related to the completion of the software update to the relay system 220.

According to an exemplary embodiment of the present disclosure, in operation 204, the relay system 220 may deliver information related to the result of the software update to the software update management system 210.

According to an exemplary embodiment of the present disclosure, the per-VIN management module 214 of the software update management system 210 may update and store an RXSWIN list for each VIN to be updated, based on the received software update result information.

According to an exemplary embodiment of the present disclosure, the per-VIN management module 214 of the software update management system 210 may manage an update history of an RXSWIN list for each VIN. As a result, a manufacturer may manage software update situations of the manufactured vehicles integrally.

Referring to FIG. 3, an example of details of the RXSWIN stored in the software update management system 210 may be identified. According to an exemplary embodiment of the present disclosure, the details of the RXSWIN may be managed for each vehicle type in the software update management system 210 of the vehicle manufacturer.

According to an exemplary embodiment of the present disclosure, the details of the RXSWIN may include a vehicle type, a regulation authority associated with the vehicle type, a regulation area, a regulation number, an ECU (controller) associated with a corresponding regulation, and version information (revision) of software for each ECU.

Furthermore, according to an exemplary embodiment of the present disclosure, the details of the RXSWIN may include a list of RXSWIN values (an issued RXSWIN) associated for each vehicle type, an ECU (an associated controller) associated for each RXSWIN value in the list of the RXSWIN values, and software version information (Package, P/No Group, SW Unit NO., Source Version, and Target Version).

Furthermore, according to an exemplary embodiment of the present disclosure, the details of the RXSWIN may further include a type approval certification number associated for each RXSWIN value in the list of the RXSWIN values and a type approval certification type (initial (NEW) and re-certification (Extension)).

The details of the RXSWIN of FIG. 3 are merely an example. Various modifications are possible in the range of meeting the description of the above-mentioned embodiments.

In generating RXSWIN information and updating the RXSWIN information in a server device of a vehicle manufacturer, various embodiments of the present disclosure is configured to modify the RXSWIN information to the extent that the essence of the present disclosure is not impaired, but may comply with the following manner. According to an exemplary embodiment of the present disclosure, when the RXSWIN value may be encoded in a human-readable format and when software affecting type approval is updated, an RXSWIN value of a vehicle control apparatus may be updated. Furthermore, when the software update does not affect type approval to be updated, the RXSWIN value of the vehicle control apparatus may fail to be updated. Only when the software update of the vehicle is successfully updated, the RXSWIN value and the final version of the software may be updated and stored for each VIN in a software update management system of the server device.

Figure 4:
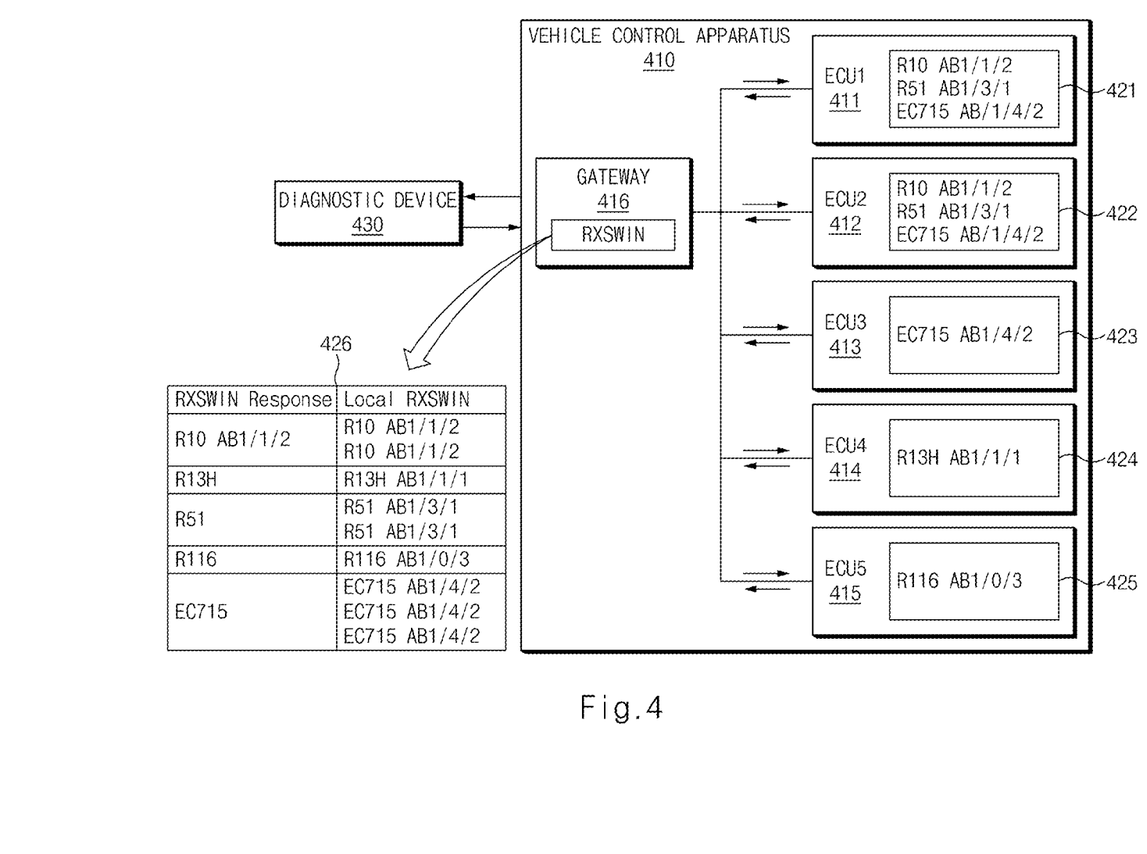
FIG. 4 is a drawing describing a method for managing RXSWIN information in a vehicle according to an exemplary embodiment of the present disclosure.

FIG. 4 is a drawing describing a method for managing RXSWIN information in a vehicle control apparatus according to an exemplary embodiment of the present disclosure.

Referring to FIG. 4, a plurality of ECUs ECU1, ECU2, ECU3, ECU4, and ECU5 (411, 412, 413, 414, and 415) and a gateway 416 may be loaded into a vehicle control apparatus 410 according to an exemplary embodiment of the present disclosure.

Pieces of RXSWIN information 421, 422, 423, 424, and 425 may be stored in pieces of software of the plurality of ECUs 411, 412, 413, 414, and 415, respectively. The pieces of RXSWIN information 421, 422, 423, 424, and 425 stored in the respective ECUs may include a list of RXSWIN values related to regulations associated with the respective ECUs.

According to an exemplary embodiment of the present disclosure, the gateway 416 may generate, store, and manage an RXSWIN master list 426 including all the pieces of RXSWIN information 421, 422, 423, 424, and 425 received from the plurality of ECUs 411, 412, 413, 414, and 415. According to an exemplary embodiment of the present disclosure, the gateway 416 may perform classification for each regulation number and may manage the RXSWIN master list 426.

When there is a request to update one of the plurality of ECUs 411, 412, 413, 414, and 415, the gateway 416 may request a diagnostic device 430 connected to the vehicle control apparatus 410 to identify the latest version of corresponding software in a software update management system (SUMS) of a vehicle manufacturer.

According to an exemplary embodiment of the present disclosure, the gateway 416 may receive the latest version of the SUMS from the diagnostic device 430. According to an exemplary embodiment of the present disclosure, the gateway 416 may compare the received latest version of the SUMS with a version of an ECU of the vehicle to determine whether to update software of the ECU.

Alternatively, according to an exemplary embodiment of the present disclosure, the gateway 416 may provide the diagnostic device 430 with version information of software. According to an exemplary embodiment of the present disclosure, as a request for version information related to specific RXSWIN information is received from the diagnostic device 430, the gateway 416 may query the RXSWIN master list 426 for the version information of the specific RXSWIN information and may transmit the version information of the specific RXSWIN information to the diagnostic device 430.

According to an exemplary embodiment of the present disclosure, after the request for the version information related to the specific RXSWIN information is received from the diagnostic device 430, when it is impossible to query the RXSWIN master list 426 for the version information of the specific RXSWIN information, the gateway 416 may transmit an error code to the diagnostic device 430.

According to an exemplary embodiment of the present disclosure, when it is determined that it is necessary to update the software, the gateway 416 may deliver software update information, which is received from the diagnostic device 430 or is received by an OTA technology, to a corresponding ECU.

According to an exemplary embodiment of the present disclosure, the vehicle control apparatus 410 may update software of an ECU based on the software update information. According to an exemplary embodiment of the present disclosure, the vehicle control apparatus 410 may update version information of RXSWIN information associated with the updated software.

For example, when the software update target is software of the first ECU 411, software of the first ECU 411 may be updated and version information of an RXSWIN value associated with the updated software among the pieces of RXSWIN information 421 of the first ECU 411 may be updated.

Furthermore, the first ECU 411 may transmit the updated RXSWIN information 421 to the gateway 416. As the updated RXSWIN information 421 is received, the gateway 416 may update the RXSWIN master list 426.

According to an exemplary embodiment of the present disclosure, the gateway 416 may transmit the updated RXSWIN information to a server device of a manufacturer of the vehicle control apparatus 410 to share the updated RXSWIN information with the server device. The server device may receive the RXSWIN information and may manage a software update situation for each VIN of the vehicle control apparatus 410.

According to an exemplary embodiment of the present disclosure, when the software update of the ECU is not successfully completed or when the software, the update of which is completed, is not associated with type approval, the ECU and the gateway 416 may fail to update the RXSWIN information and may fail to transmit the RXSWIN information to the server device.

Embodiments of the present disclosure is able to modify the RXSWIN information to the extent that the essence of the present disclosure is not impaired in a process of reading and searching for the RXSWIN information, but may comply with the following manner.

When the diagnostic device 430 requests to query for an RXSWIN version, the gateway 416 may query for the RXSWIN version of each of the ECUs 411, 412, 413, 414, and 415 and may transmit the RXSWIN version. A plurality of RXSWINs which are present in the vehicle may be included in an RXSWIN information list received in the gateway 416 from all the ECUs 411, 412, 413, 414, and 415. The gateway 416 may proceed with a task for generating the RXSWIN master list 426 including all the pieces of RXSWIN information 421, 422, 423, 424, and 425 received from the plurality of ECUs 411, 412, 413, 414, and 415.

The gateway 416 may manage the RXSWIN master list 426 and may update the pieces of RXSWIN information 421, 422, 423, 424, and 425 received from the ECUs 411, 412, 413, 414, and 415 in the RXSWIN master list 426.

The RXSWIN master list 426 may be delivered from the gateway 416 to the diagnostic device 430. When it is impossible to read the RXSWIN, an error code rather than the RXSWIN master list 426 may be delivered to the diagnostic device 430.

Meanwhile, according to an exemplary embodiment of the present disclosure, the gateway 416 may be configured to collect pieces of RXSWIN information received from the ECU and filter the pieces of information and may be configured to request pieces of RXSWIN information from the ECU, as an update information request for software associated with vehicle type approval (VTA) is received, collect and filter updated RXSWIN information, as the update of the software of the ECU corresponding to the update information is completed, and respond to the request to replay with the latest RXSWIN information.

According to an exemplary embodiment of the present disclosure, the gateway 416 may be configured to transmit information indicating that an update of software is completed to the server device as the update of the software is completed for each VIN.

According to an exemplary embodiment of the present disclosure, the gateway 416 may be configured to collect a plurality of pieces of RXSWIN information received from a plurality of ECUs included in the vehicle control apparatus 410 and generate and update RXSWIN information.

According to an exemplary embodiment of the present disclosure, the gateway 416 may be configured not to transmit the latest RXSWIN master list, when the update of the software of the ECU is not successfully updated.

According to an exemplary embodiment of the present disclosure, the gateway 416 may be configured to, when the plurality of ECUs have pieces of the same RXSWIN information, transmit the latest RXSWIN information among the pieces of the same RXSWIN information.

According to an exemplary embodiment of the present disclosure, the gateway 416 may be configured to receive a version information request for RXSWIN information from the diagnostic device 430, collect a plurality of pieces of RXSWIN information received from the plurality of ECUs included in the vehicle control apparatus 410 to generate and update RXSWIN information, and transmit the updated RXSWIN information to the diagnostic device 430.

According to an exemplary embodiment of the present disclosure, the gateway 416 may be configured to receive a version information request for RXSWIN information from the diagnostic device 430, generate and update the latest RXSWIN information among pieces of the same RXSWIN information, when the plurality of ECUs included in the vehicle control apparatus 410 have the pieces of the same RXSWIN information, and transmit the updated RXSWIN information to the diagnostic device 430.

According to an exemplary embodiment of the present disclosure, the gateway 416 may be configured to receive a version information request for RXSWIN information from the diagnostic device 430 and not to transmit version information of specific RXSWIN information to the diagnostic device 430, when it is impossible to query for the version information of the specific RXSWIN information.

According to an exemplary embodiment of the present disclosure, the gateway 416 may transmit information indicating that an update of software is completed to the server device as the update of the software is completed, and the server device may receive the information indicating that the update of the software is completed for each VIN.

According to an exemplary embodiment of the present disclosure, when the update of the software of the ECU is not successfully completed, the server device may fail to complete an update for each VIN in the server device.

According to an exemplary embodiment of the present disclosure, the server device may link and store RXSWIN information stored in the server device to version information of related software.

According to an exemplary embodiment of the present disclosure, the server device may generate and store RXSWIN information using one ASCII string including information related to an authority issuing a regulation, information related to a regulation number of the regulation, information related to a vehicle type receiving vehicle type approval, and re-certification information of the vehicle type approval.

According to an exemplary embodiment of the present disclosure, the server device may store and manage a history of RXSWIN information every a plurality of VINs.

According to an exemplary embodiment of the present disclosure, the server device may perform an operation of identifying VINs which are targets of update information and an RXSWIN master list for every VINs, before distributing update information related to software associated with vehicle type approval.

Embodiments of the present disclosure is configured to modify the RXSWIN information to the extent that the essence of the present disclosure is not impaired in a process of writing the RXSWIN information, which may comply with the following manner.

RXSWIN information stored in the vehicle may not be changed without a permission, and an update is impossible using separate update equipment (or a diagnostic device or the like). The RXSWIN information may be embedded in the ECU in the vehicle, when a software package (or a binary image) is generated, and may be updated together, only when software is updated by authorized equipment and/or a developer.

The electronic device according to various embodiments of the present disclosure may standardize a system which manages versions of a plurality of pieces of software loaded into the vehicle, thus shortening a time taken to update software in the vehicle.

As the necessity of updating software occurs in the vehicle after the vehicle is mass-produced, when several types of ECUs should be updated at a same time according to a function-related range, as the software update proceeds on an individual ECU basis, the vehicle may be inspected to inspect whether there is no problem in function or an update should be additionally performed again even after the update. However, various embodiments of the present disclosure may standardize a system which manages versions of pieces of software to prevent taking a lot of time in performing and managing a software update.

Furthermore, a vehicle manufacturer should obtain a certification complying with European Regulation R156 before mass production to sell a vehicle in Europe. Various embodiments of the present disclosure may provide a management system including a manner which configures RXSWIN information meeting six items of major requirements for the RXSWIN of the regulation R156 and generates, searches for, and writs RXSWIN information, thus allowing a vehicle manufacturer to perform regulation certification work.

Figure 5:
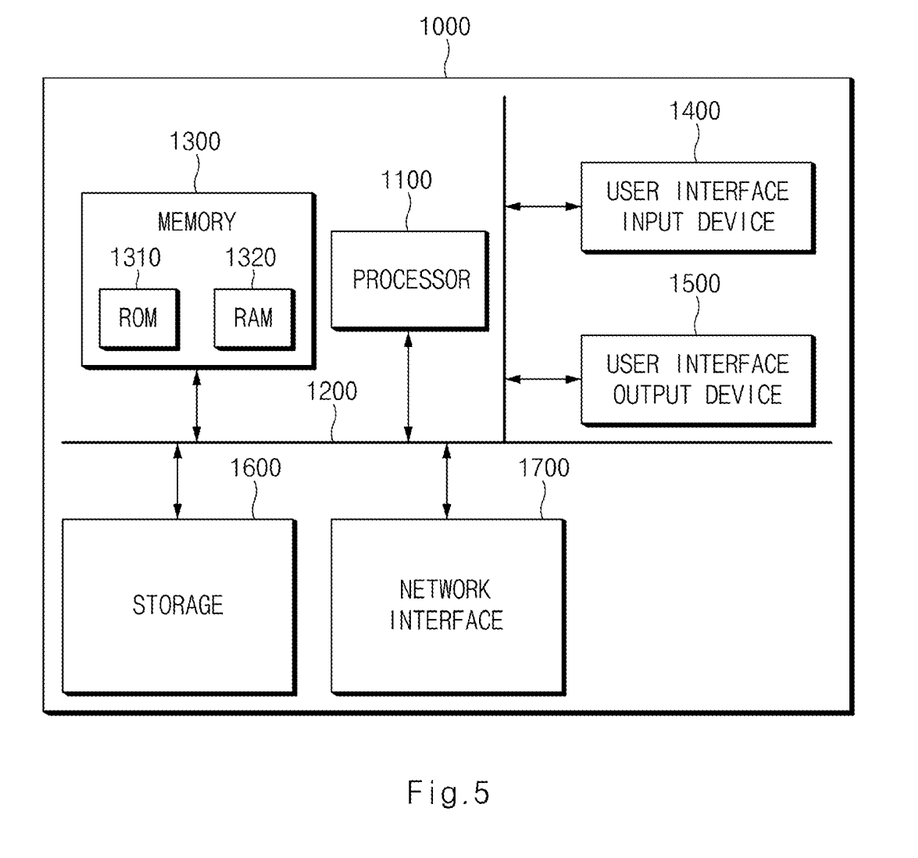
FIG. 5 is a block diagram illustrating a computing system according to an exemplary embodiment of the present disclosure.

FIG. 5 is a block diagram illustrating a computing system according to an exemplary embodiment of the present disclosure.

Referring to FIG. 5, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The vehicle control apparatus according to various embodiments of the present disclosure may standardize a system which manages versions of a plurality of pieces of software loaded into the vehicle control apparatus and may shorten a time taken to update software in the vehicle control apparatus.

Furthermore, the vehicle control apparatus according to various embodiments of the present disclosure may provide a management system including a manner which configures RXSWIN information meeting six items of major requirements for the RXSWIN of the regulation R156 and generates, searches for, and writes the RXSWIN information, thus allowing the vehicle manufacturer to perform regulation certification work.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus, comprising:
   an electronic control unit; and
   a gateway,
   wherein the electronic control unit is configured to store software identification management information including regulation X software identification number (RXSWIN) information recorded with an identifier indicating a combination of software version of the electronic control unit associated with Vehicle Type Approval (VTA) for a regulation, and wherein the gateway is configured to:
- store a master list of the software identification management information, the master list including the software identification management information received from the electronic control unit;
- deliver update information related to software associated with the VTA to the electronic control unit corresponding to the update information, when the update information is received; and
- update the software identification management information associated with the electronic control unit in the master list when an update of the software of the electronic control unit is completed, and wherein the RXSWIN information for meeting a requirement of the regulation is one American standard code (ASCII) string including information related to an authority issuing the regulation associated with the electronic control unit, information related to a regulation number of the regulation, information related to a vehicle type receiving the VTA, and re-certification information of the VTA.

2. The vehicle control apparatus of claim 1, wherein the gateway is configured to transmit information indicating that the update of the software is completed to a server device when the update of the software is completed, for matching with software identification management information stored in the server device.

3. The vehicle control apparatus of claim 1, wherein the gateway is configured not to update the master list, when receiving update information related to software not associated with the VTA.

4. The vehicle control apparatus of claim 1, wherein the gateway is configured not to update the master list, when the update of the software of the electronic control unit is not completed.

5. The vehicle control apparatus of claim 1, wherein the gateway is configured to query the master list for version information of specific software identification management information and transmit the version information to a diagnostic device, when a request for the version information related to the specific software identification management information is received from the diagnostic device.

6. The vehicle control apparatus of claim 1, wherein the gateway is configured to receive a request for version information related to specific software identification management information from a diagnostic device and transmit an error code to the diagnostic device when it is impossible to query the master list for the version information of the specific software identification management information.

7. The vehicle control apparatus of claim 1, wherein the gateway is configured to collect a plurality of pieces of software identification management information received from a plurality of electronic control units included in the vehicle control apparatus and generate and update the master list.

8. A vehicle control system, comprising:
- a server device configured to distribute update information related to software associated with vehicle type approval (VTA); and
- a vehicle control apparatus configured to receive the update information and have a vehicle identification number (VIN) being a target of the update information, wherein the vehicle control apparatus is configured to deliver the update information to an electronic control unit of the vehicle control apparatus, the electronic control unit corresponding to the received update information, and the vehicle control apparatus further configured to update software identification management information associated with the electronic control unit in a master list stored in a gateway of the vehicle control apparatus when an update of the software of the electronic control unit is completed, wherein the electronic control unit is configured to store software identification management information including regulation X software identification number (RXSWIN) information recorded with an identifier indicating a combination of software version of the electronic control unit associated with the (VTA) for a regulation, and wherein the server device is further configured to generate and store the RXSWIN information for meeting a requirement of the regulation, using one American standard code (ASCII) string including information related to an authority issuing the regulation, information related to a regulation number of the regulation, information related to a vehicle type receiving the VTA, and re-certification information of the VTA.

9. The vehicle control system of claim 8, wherein the gateway is configured to transmit information indicating that the update of the software is completed to the server device when the update of the software is completed, and wherein the server device is configured to update version information of software identification management information stored in the server device when the information indicating that the update of the software is completed is received.

10. The vehicle control system of claim 8, wherein the gateway is configured not to update the master list, when receiving update information related to software not associated with the VTA.

11. The vehicle control system of claim 8, wherein the gateway is configured not to update the master list, when the update of the software of the electronic control unit is not completed.

12. The vehicle control system of claim 8, wherein the server device is configured not to update software identification management information stored in the server device, when receiving update complete information related to software not associated with the VTA and when the update of the software of the electronic control unit is not completed.

13. The vehicle control system of claim 8, wherein the server device is configured to link and store software identification management information stored in the server device to version information of related software.

14. The vehicle control system of claim 8, wherein the server device is configured to store and manage a history of software identification management information every each of a plurality of VINs.

15. The vehicle control system of claim 8, wherein the server device is configured to perform an operation of identifying VINs being targets of the update information and a master list for every VINs, before distributing the update information related to the software associated with the VTA.

16. The vehicle control system of claim 8, wherein the gateway is configured to query the master list for version information of specific software identification management information and to transmit the version information to a diagnostic device, when a request for the version information related to the specific software identification management information is received from the diagnostic device.

17. The vehicle control system of claim 8, wherein the gateway is configured to receive a request for version information related to specific software identification management information from a diagnostic device and to transmit an error code to the diagnostic device when it is impossible to query the master list for the version information of the specific software identification management information.

18. The vehicle control system of claim 8, wherein the gateway is configured to collect a plurality of pieces of software identification management information received from a plurality of electronic control units included in the vehicle control apparatus and to generate and update the master list.

* * * * *